June 30, 1953 G. W. FYLER ET AL 2,644,104

TELEVISION CIRCUIT

Filed July 10, 1951 3 Sheets-Sheet 1

INVENTORS.
George W. Fyler
Lawrence J. Mattingly
BY
Norman L. Mueller
Atty.

TELEVISION CIRCUIT

INVENTORS.
George W. Fyler
BY Lawrence J. Mattingly
Norman L. Mueller
Atty.

INVENTORS.
George W. Fyler
Lawrence J. Mattingly
BY
Norman L. Mueller
Atty.

Patented June 30, 1953 2,644,104

UNITED STATES PATENT OFFICE 2,644,104

TELEVISION CIRCUIT

George W. Fyler and Lawrence J. Mattingly, Lombard, Ill., assignors to Motorola, Inc., Chicago, Ill., a corporation of Illinois Application July 10, 1951, Serial No. 235,945

15 Claims. (Cl. 315—27)

This invention relates to cathode ray beam deflection circuits and more particularly to circuits for producing horizontal sweep and high voltage for the tube of a television receiver, which are adjustable to vary the horizontal size of the picture.

Horizontal sweep circuits using a damper tube and a series bootstrap circuit are used extensively is television receivers to supply horizontal sweep current and accelerating voltage to the cathode ray tubes thereof, and the advantages of such circuits are well known. To obtain horizontal size control with circuits of this type, it has been the usual practice to employ a variable inductance connected across a portion of the primary section of the coupling choke unit or transformer. This arrangement provides satisfactory size control but it is relatively expensive. While other arrangements have been proposed which would be less expensive, these have not been satisfactory in operation.

It is accordingly one of the objects of the present invention to provide a cathode ray beam deflecting circuit in which horizontal size adjustment is obtained very simply and inexpensively and yet very effectively.

Another object is to provide a circuit in which horizontal size adjustment is effected by adjusting the coupling choke unit of the sweep circuit itself without requiring any separate or additional units.

A further object is to provide a coupling choke unit for use in a cathode ray beam deflection and acceleration circuit which is constructed so that either the horizontal sweep current or the acceleration voltage may be varied independently of the other.

According to one feature of the invention, a horizontal sweep circuit is provided having a coupling choke with a core which is adjustable for varying the sweep current without substantially affecting the high accelerating voltage which is derived from the same unit. Alternatively, an adjustment of the core may be provided for controlling the high accelerating voltage independently of the sweep current.

According to another feature, a coupling choke is provided including a core having a first portion with sweep windings thereon, and a second portion with high voltage windings thereon, in which the inductance of the coupling choke unit is varied without substantially affecting the high voltage output. This is preferably accomplished by varying an air gap in the portion of the core on which the sweep windings are mounted.

The above and other objects and features of the invention will be more readily apparent from the following description when read in connection with the accompanying drawings in which.

Figure 1:
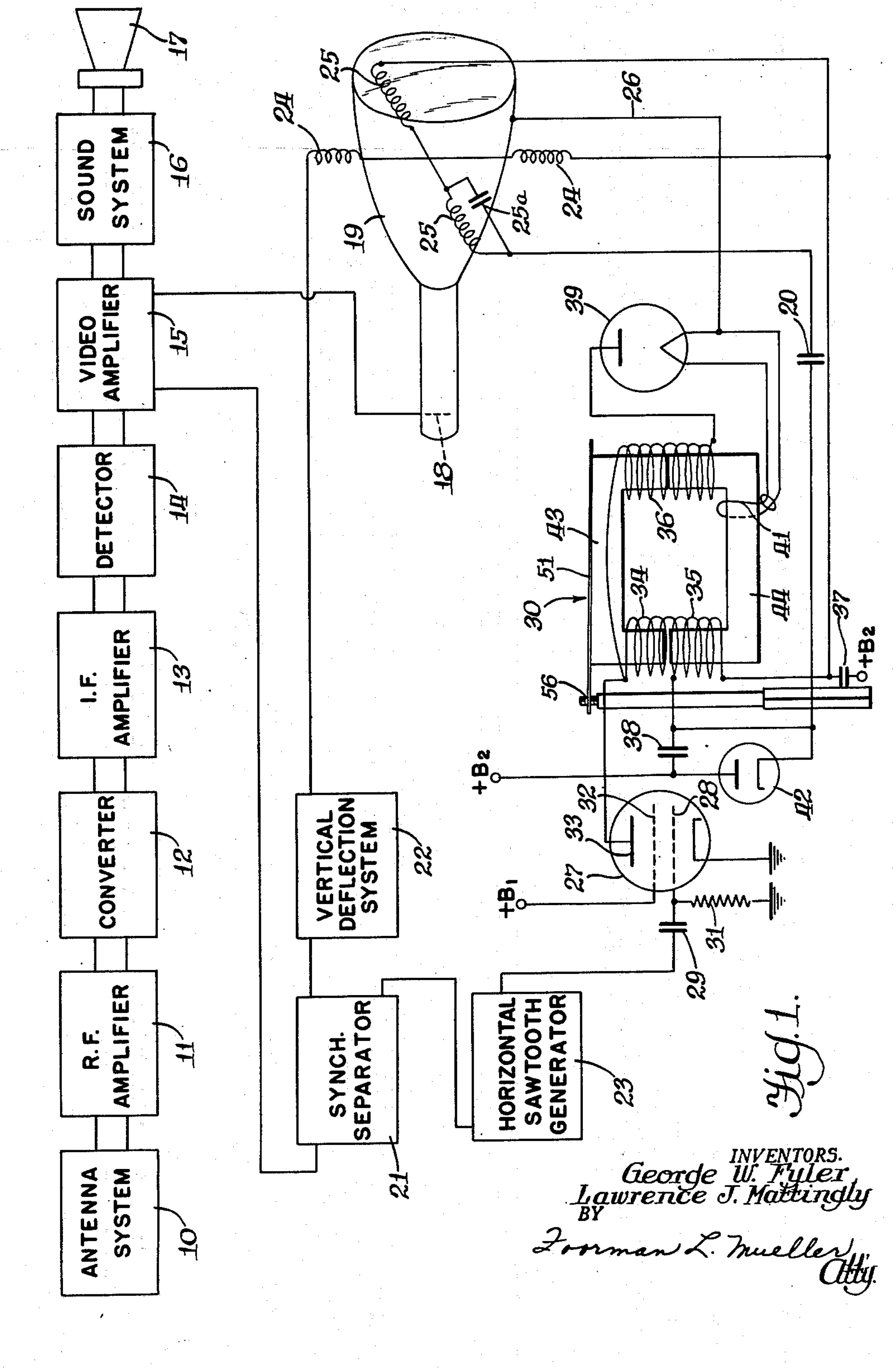
Figure 1 is a block diagram of a television receiver including a circuit diagram of a deflection circuit embodying the invention.

As shown in Figure 1, a television receiver to which the invention is applied may comprise an antenna system 10 to pick up transmitted signals and supply them to a radio frequency amplifier 11. The amplified signals are fed to a converter 12, an intermediate frequency amplifier 13, and a detector 14. From the detector the signals are fed to a video amplifier 15, the audio signals passing through to a sound system 16 terminating in a loud speaker 17.

From the video amplifier, the video signals may be applied to a control electrode 18 of the cathode ray tube 19 to vary the beam intensity. Video signals are also supplied to a synchronization signal separator 21 which separates the vertical and horizontal synchronization pulses and supplies them respectively to a vertical deflection system 22 and a horizontal system including sawtooth generator 23. The vertical deflection system 22 is connected to vertical deflection windings 24 associated with the tube 19 to control vertical sweep of the beam therein in the usual manner. The horizontal sawtooth generator 23 is connected through an output circuit to horizontal deflection windings 25 to provide sawtooth currents to control horizontal sweep of the beam. The output circuit also includes means providing a voltage for the acceleration anode in the tube, which is applied through a connection 26.

The horizontal output or sweep circuit as shown in Figure 1 includes an amplifier tube 27 having a control grid 28 connected through a condenser 29 to the horizontal sawtooth generator 23 and biassed to ground by a resistor 31. As shown, the tube 27, has a cathode connected to ground, a screen grid 32 connected to a positive potential designated plus $B_1$, and an anode 33 connected to a choke 30. The choke 30 serves as an autotransformer and includes windings 34, 35 and 36 connected in series and provided on a core formed of sections 43 and 44. The windings 34 and 35 together form the primary section, winding 35 forms the sweep secondary section, and windings 34, 35 and 36 connected in series form the high voltage secondary section.

The anode 33 of tube 27 is connected to the primary section (34 and 35) of the choke windings, and through condenser 37 to plus $B_2$, which is higher than $B_1$. The circuit also includes a damper efficiency diode 42 whose anode is connected to plus $B_2$, and whose cathode is connected to the common point between the winding sections 34 and 35. The diode is bridged by a condenser 38. The winding section 35 is connected to the horizontal deflection coils 25 through condenser 20. A condenser 25*a* is bridged across one of the coils 25 to prevent ringing currents from distorting the sweep. The winding sections 34 and 35 therefore form an autotransformer for providing the output sweep current, and as the transformer primary includes both sections 34 and 35 and the secondary includes only section 35, the output current is stepped up.

Accelerating voltage is supplied to the connection 26 through a diode rectifier 39 whose anode is connected to the high voltage secondary winding 36. The winding sections 34, 35 and 36 form an autotransformer for providing the high voltage output, and as the transformer primary includes only the sections 34 and 35 and the secondary includes the sections 34, 35 and 36, the output voltage is stepped up thereby. A filament winding 41 may be provided on the core 43, 44 to furnish heating current for the cathode of the diode 39.

Considering the operation of the circuit as so far described, the horizontal sawtooth generator provides an exciting sawtooth voltage wave to the grid 28 of the tube 27. This voltage wave is of sufficient amplitude so that the tube is biased by grid current and plate current flows only during the latter portion, approximately two-thirds, of the sweep cycle. The plate current builds up to a maximum at which time the tube 27 is suddenly cut off, leaving considerable stored magnetic energy in the yoke windings 25 and the primary coils 34, 35. The amount of stored energy depends upon the relatively large plate voltage applied to tube 27 which is not only the B plus voltage, but also the added "bootstrap" voltage developed on condenser 37.

During the retrace, the inductive stored energy discharges into the circuit capacity comprising condenser 38 plus the various stray capacities associated with the autotransformer windings 34, 35 and 36 producing a half cycle of oscillation in the form of a high voltage pulse. The oscillation is terminated by the damper diode 42 when the magnetic energy is a maximum in the opposite direction and the voltage at the cathode of diode 42 tends to go negative with respect to plus $B_2$ at the anode thereof. This means that a negative voltage equal approximately to the potential appearing in condenser 37 is allowed to develop across the winding 35 and the yoke. This potential controls the rate of decay of the current in the yoke based on the formula:

$$E=-L\,di/dt$$

The total change in current during the damper tube conduction is, of course, dependent upon the original stored energy and follows the relation:

$$W=\tfrac{1}{2}LI^2$$

The circuit losses must, of course, be considered. The damper tube conducts at about the same rate of current change as the sweep tube in so far as the yoke current is concerned, so that a substantially linear sweep results. The damper tube only conducts for about one third of the trace portion of the cycle and the action is similar to that of a class B amplifier in the period where the currents overlap. During the conduction of the damper tube, energy is stored in the condenser 37 from the discharge of the magnetic sweep circuit. The electrostatic energy stored in 37 is, of course, added to that provided by the power supply for operating the tube 27 during its conduction period. The windings 34, 35, and the yoke inductance must be properly apportioned for best linearity and efficiency. Values which have been found to be satisfactory are given later in this application.

The condenser 38 is not absolutely essential to the operation of the system but has been found to provide improved results. This condenser operates to lengthen the high voltage pulse so that regulation of the high voltage supply is thereby improved. Further, it reduces ringing in the windings and thereby improves the linearity. It has been found that this condenser serves to tune the windings to some extent to increase the amplitude of the sawtooth current wave, and thereby increase the horizontal size.

Figures 2, 3, 4:
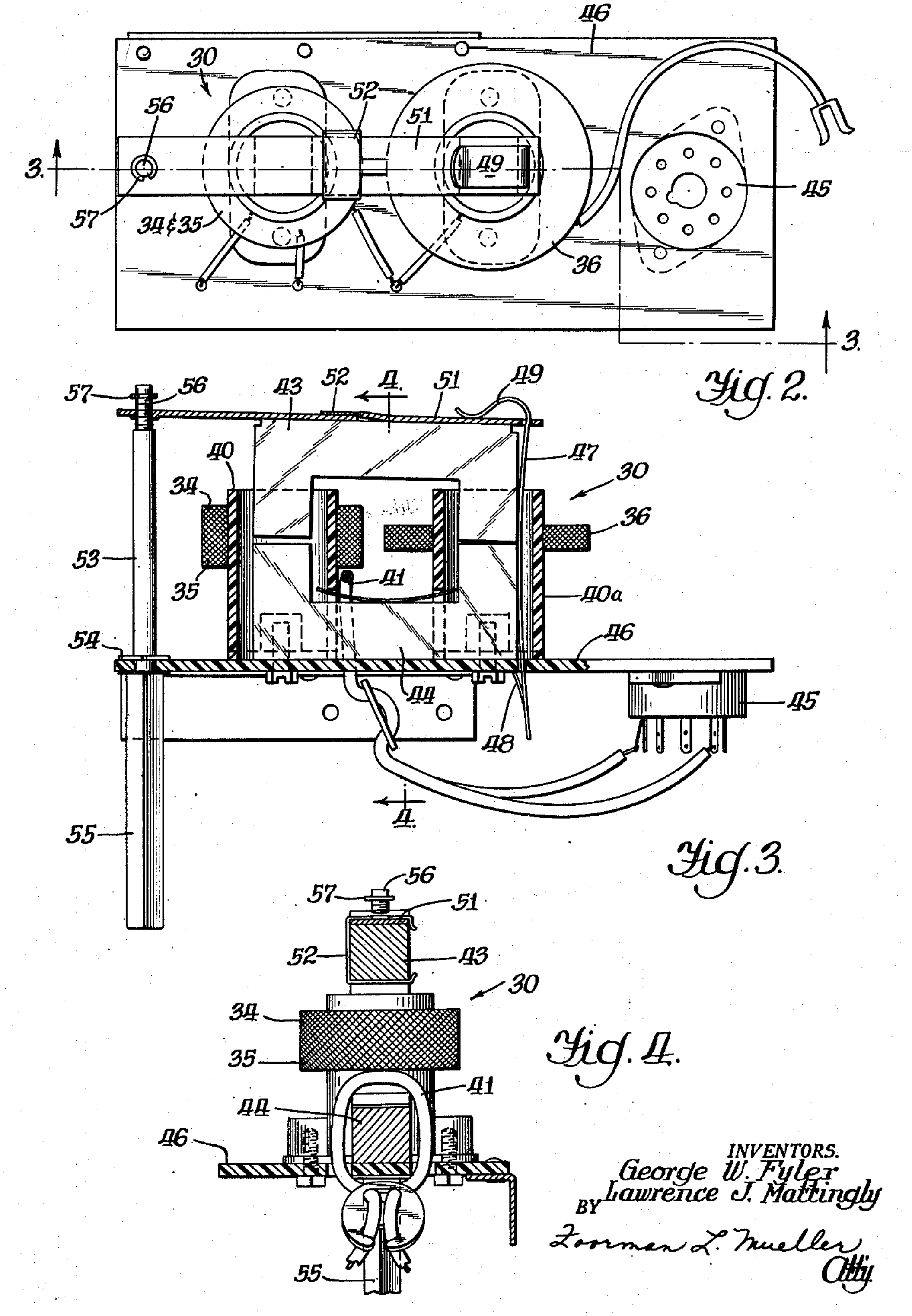
Figure 2 is a top plan view of a coupling choke unit embodying the invention.
Figure 3 is a section on the broken line 3—3 of Figure 2.
Figure 4 is a section on the line 4—4 of Figure 3.

The coupling choke unit as more particularly illustrated in Figures 2, 3 and 4 comprises a magnetic core on which the windings 34, 35 and 36 are mounted. The core is rectangular in section and is formed of two U-shaped portions 43 and 44 which are fitted together with the ends of the legs in abutting relationship. The windings 34 and 35 are wound one over the other on the insulating form 40, and are placed about one of the abutting legs on one side of the core, substantially symmetrically with respect to the junction therebetween. The high voltage winding 36 is wound on form $40_a$, which may be identical with form 40, and is placed on the other side symmetrically with respect to the abutting legs of the core on that side. The filament winding 41 is connected to a socket 45 in which the diode rectifier 39 may be mounted. As shown, the socket 45 and the core portion 44 are rigidly mounted on a plate 46 formed of insulating material by which the unit may be mounted in the chassis.

The upper core portion 43 is held against the lower core portion 44 by a leaf spring 47 which extends through an opening in the plate 46 and has a tongue 48 bent therefrom to engage the plate thereby to anchor the lower end of the spring. The spring is bent over at its upper end as indicated at 49 and extends through an opening in a strip 51, which may be of brass, which overlies the upper core portion 43. The spring 47 is arranged at the same end of the core as the high voltage winding 36 to hold the ends of the core leg portions firmly together thereby to minimize the air gap in the core at this leg part thereof under all conditions. A slight curvature of one of the ends of the core legs may be provided to minimize variations in this air gap.

The strip 51 is secured to the core portion 43 by means of a clamp 52 so that the strip can serve to move the core portion. For this purpose a rod 53 is mounted in the plate 46 for free rotation therein but is held against axial sliding by a C washer 54. At its outer end the rod terminates in a shaft portion 55 by which it may be turned to effect the adjustment and at its upper end the rod has a threaded portion 56 which is threaded onto the end of the strip 51. Preferably a C-washer 57 is secured to the end of the rod to prevent accidental removal of the strip 51.

By turning the rod 53 the core portion 43 can be swung about its right leg as a pivot to open to the desired extent an air gap in its left leg which is substantially in register with the primary and secondary windings 34 and 35. When the rod is turned to close this air gap, maximum coupling will be obtained between the primary and secondary windings so that the horizontal sweep current will reach its maximum value and the picture will be of maximum size. As the rod is turned to open the air gap as shown in Figure 3, the reluctance of the magnetic path through the primary and secondary winding sections will be increased to decrease the effective inductance of the windings. This will reduce the horizontal sweep current to reduce the picture size. The air gap in the right leg of the core within the high voltage winding 36 will, however, be substantially uneffected so that the high voltage produced will remain substantially constant.

Figure 5:
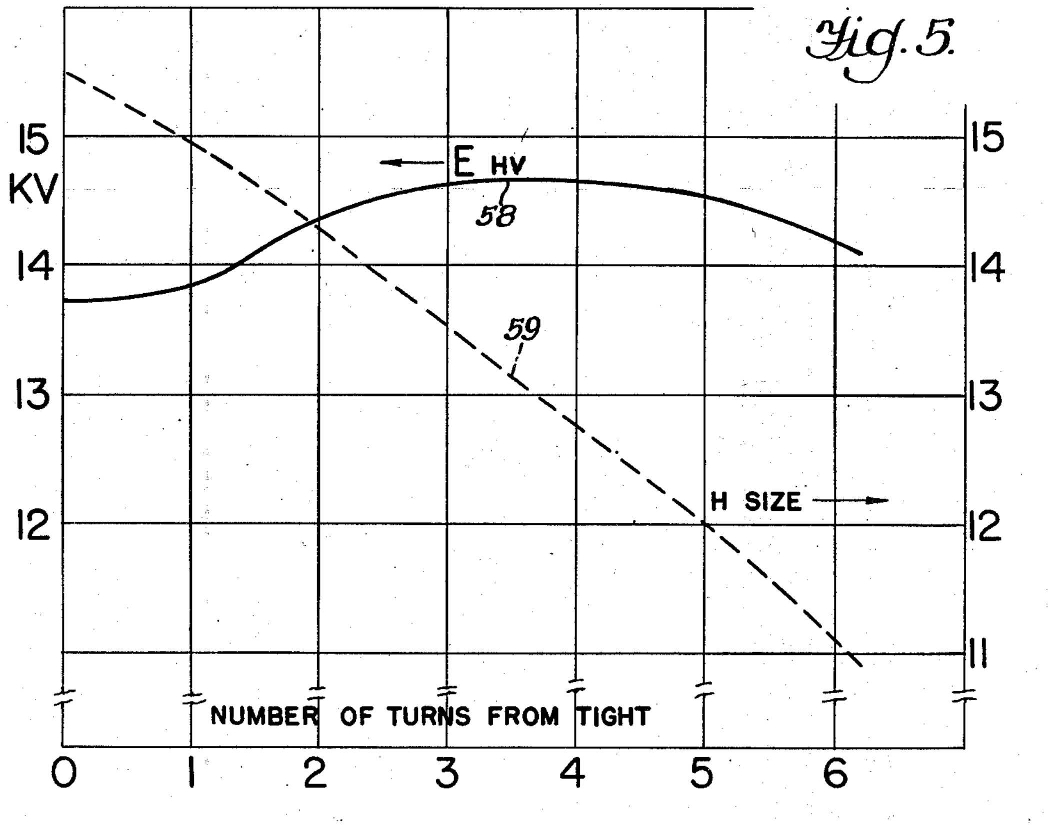
Figure 5 is a diagram illustrating the effect of the adjustment.

The effect of the adjustment on the horizontal sweep current and on the accelerating voltage is indicated by the curves shown in Figure 5. In these curves the horizontal distance indicates turns of the control rod 53 from its closed toward its open position, which is a measure of the air gap opening. The solid curve 58 is calibrated in terms of accelerating voltage kilo-volts as indicated by the scale at the lefthand side of the graph. The dotted curve 59 indicates horizontal picture size in inches as indicated by the scale at the righthand side of the graph.

It will be seen from these curves that if the air gap is opened, the horizontal size of the picture is reduced substantially according to a straight line function. At the same time there is a slight increase followed by a slight fall off in accelerating voltage. This change, however, is not sufficient to effect materially the accelerating voltage such as to require refocusing. A large range in horizontal size control is obtained without effecting horizontal linearity in the particular circuit shown.

The above curves were produced by a unit which is shown in substantially full scale in the drawing. The core is made of material having a very high permeability (ferrite) and has a cross-section approximately $\frac{9}{16}$ of an inch square. Each U-shaped portion has legs spaced apart on the inside by about 1¼ inches and extending from the bight portion approximately ½ an inch. To produce the required deflection and high voltage for a 17-inch picture tube, the sections 34 and 35 together include approximately 750 turns with the section 35 having approximately 450 of the turns. The high voltage winding 36 has approximately 1000 turns.

The choke described is used with a tube 27 of the 6BQ6 type, a tube 42 of the 12AX4 type and a tube 39 of the 1B3GT type. The yoke 24 has an inductance of the order of 24 millihenrys. The coupling condenser 20 has a capacity of .1 microfarad, the condenser 38 a value of the order of 180 micromicrofarads, the condenser 37 a value of 10 microfarads, and the condenser 25a shunting one of the yoke windings a value of the order of 47 micromicrofarads. In this unit the junction of the core portions under the windings 34 and 35 has a fixed minimum gap of approximately 7 mils which prevents direct current saturization of the core. This gap is increased to as much as ⅛ of an inch to provide the size control previously described.

Figure 6:
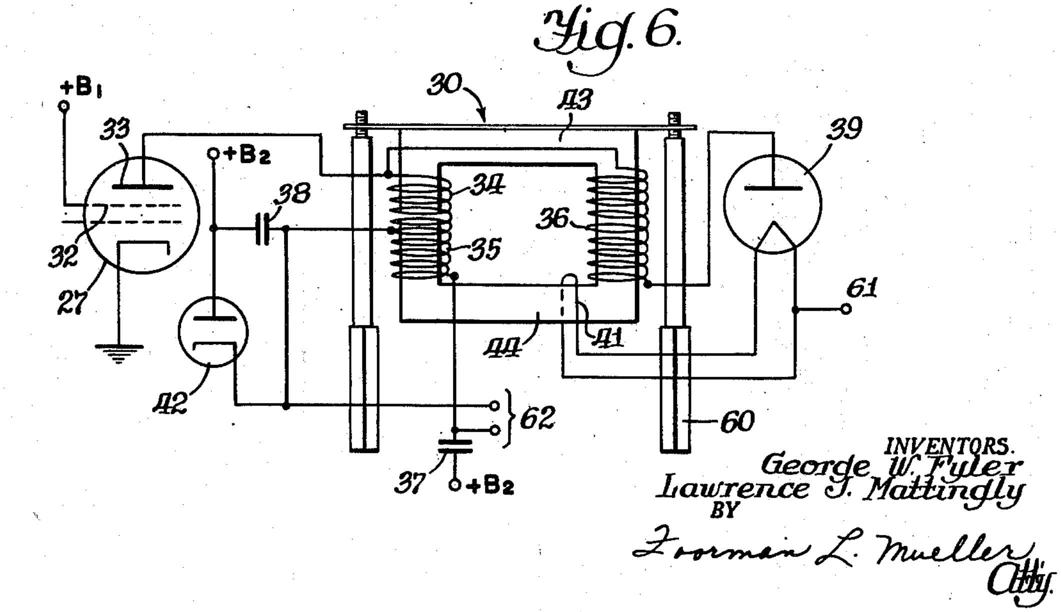
Figure 6 illustrates a second embodiment of the invention.

It has been found that if the air gap at the right side of the core is varied while the air gap at the left side is kept constant, the picture size stays substantially constant whereas the high voltage changes rapidly and requires refocusing. For use in television, it is desirable to keep the high voltage as high as possible and to keep it uniform so that definition, contrast, and brightness remain fixed. In certain other applications it may be desirable to vary the high voltage and a choke structure for accomplishing this is illustrated in Figure 6. In Figure 6 the components may be generally similar to those previously described except that an adjusting rod is provided for changing the gap at the right side of the core, in addition to the adjusting rod for changing the gap at the left side. In such a unit by turning the control rod 60, the high voltage produced by the unit at the terminal 61 can be controlled substantially independently of the sweep output which is derived from the terminals 62. As previously described, by the use of the control rod 63, the sweep current at the output terminals 62 can be controlled substantially independently of the high voltage produced with the terminal 61. It is obvious that by use of the two controls 60 and 63, both the sweep current and the high voltage can be adjusted.

It will be seen that by the present invention, an accurate and substantially linear size control is provided without requiring any expensive additional parts and simply by adjusting an air gap in the core of the coupling choke unit itself. This is accomplished without appreciably affecting the high voltage and without introducing any complications into the circuit.

While certain embodiments of the invention have been shown and described in detail, it will be understood that these are illustrative only, and are not to be taken as a definition of the scope of the invention, reference being had for this purpose to the appended claims.

We claim:

1. A cathode ray beam deflecting circuit of the type which includes a sawtooth current generator for delivering cyclically varying current to electromagnetic deflection means associated with a cathode ray tube, and which also includes rectifier means for delivering accelerating voltage to an accelerating anode of said tube, said circuit including an autotransformer coupling choke unit having a magnetic core and first and second winding sections in spaced relation thereon, said first winding section being connected to the sawtooth current generator to be energized thereby and serving as a primary winding, means connecting the deflection means in parallel with at least a portion of said first winding section for providing sawtooth current waves therein, said second winding section being connected in series with said first winding section and being coupled to the rectifier means, and adjusting means for varying the magnetic reluctance of said core adjacent one of said winding sections.

2. A transformer assembly for use in a circuit for providing beam deflecting current and beam accelerating voltage for a cathode ray tube, said assembly including in combination, a magnetic core formed of first and second core members each including an elongated base portion and arm portions extending from the ends of said base portion so that said members are of generally U-shape, a supporting plate for said assembly, first supporting means for supporting said first core member on said supporting plate with said arms thereof extending away from said plate, second supporting means for said second core member for holding the same with the arms thereof substantially in abutment with the arms of said first core member to form a substantially closed magnetic circuit, said second supporting means including a strip extending along the base portion of said second core member, means for securing said second core member to said strip, means extending along the abutting arms of said core members on one side of said core and operatively connected to said strip and said supporting plate to hold said abutting arms on said one side of said core in close engagement with each other, adjustable means operatively connected to said strip for separating the abutting arms of said core members on the side of said core opposite to said one side, tubular insulating forms positioned about said abutting arms of said core members on the opposite sides of said core, and first and second winding means on said insulating forms, said first winding means being positioned on said insulating form on said opposite side of said magnetic core and serving as an autotransformer for beam deflecting current, said second winding means being positioned on said insulating form on said one side of said core and being connected in series with said first winding means and serving as a high voltage winding.

3. A transformer unit for a cathode ray beam deflecting and accelerating system including in combination, a magnetic core formed of two generally U-shaped portions, said portions being positioned to form a substantially closed magnetic circuit having opposite sides which include the abutting arms of said U-shaped core portions, first and second magnetically coupled winding means individually positioned on said opposite sides of said core about said abutting arms, said first winding means serving as a primary winding and having a portion thereof serving as a secondary winding for providing beam deflecting current, said second winding means being connected in series with said first means and serving as a high voltage winding, and means for supporting said core portions with the arms thereof in substantially abutting relation including adjusting means for varying the gap between abutting arms of said core portions adjacent said first winding means to thereby vary the deflecting current produced by said choke unit without substantially affecting the high voltage produced thereby.

4. In a television system which has therein a cathode ray tube and a circuit for providing beam deflecting current and beam accelerating voltage therefor, an autotransformer assembly for connection into the deflecting and accelerating circuit, said autotransformer assembly including in combination, a magnetic core formed of first and second portions positioned to form a substantially closed magnetic structure, said core having first and second sections which include the abutting arms of said core portions, first and second winding means positioned about said core, with said first winding means being positioned on said first section thereof about the abutting arms, said first winding means serving as a primary winding and having a part thereof serving as a seconadry winding so that the current is stepped up therein to provide the beam deflecting current, means connecting said second winding means in series with said first winding means so that the voltage is stepped up therein to provide the beam accelerating voltage, and supporting means for said core portions for holding said arms thereof in substantially abutting relation, said supporting means including adjustable means for separating the abutting arms of said core portions on said first section of said core to provide an adjustable gap therebetween and thereby vary the reluctance of the flux path through said first winding means to thereby vary the output current, said supporting means including means for holding the abutting arms of said core portions on said second section of said core substantially in engagement with each other.

5. An autotransformer assembly for use in a circuit for providing beam deflecting current and beam accelerating voltage for a cathode ray tube, said assembly including in combination, a magnetic core formed of first and second generally U-shaped portions, said portions being positioned to form a substantially closed magnetic structure having first and second opposite sides which include the abutting arms of said U-shaped core portions, first and second winding means individually positioned about said abutting arms on said first and second sides of said magnetic structure respectively, said first winding means serving as a primary winding and having a part thereof serving as a secondary winding so that the current is stepped up therein to provide the beam deflecting current, means connecting said second winding means in series with said first winding means so that the voltage is stepped up therein to provide the beam accelerating voltage, and supporting means for said core portions for holding said arms thereof in substantially abutting relation, said supporting means including adjustable means for separating the abutting arms of said core portions on said first side of said core to provide an adjustable gap therebetween and thereby vary the reluctance of the flux path through said first winding means, said supporting means including means for holding the abutting arms of said core portion on said second side of said core substantially in engagement with each other.

6. In a television system which has therein a cathode ray tube and a circuit for providing beam deflecting current and beam accelerating voltage therefor, a transformer assembly for connection into the deflecting and accelerating circuit, said transformer assembly including in combination, a magnetic core formed of first and second portions positioned to form a substantially closed magnetic structure, said magnetic core having first and second sides which include the abutting arms of said core portions, first and second winding means positioned about said magnetic core, with said first winding means being positioned on said first side thereof about the abutting arms, said first winding means serving as an auto transformer for providing the beam deflecting current, means connecting said second winding means in series with said first winding means so that said first and second winding means together form an autotransformer in which the voltage is stepped up to provide the beam accelerating voltage, and supporting means for said core portions for holding said arms thereof in substantially abutting relation, said supporting means including adjustable means for separating the abutting arms of said core portions on said first side of said core to provide an adjustable gap therebetween and thereby vary the reluctance of the flux path through said first winding means, said supporting means including means for holding the abutting arms of said core portions on said second side of said core substantially in engagement with each other.

7. A transformer assembly for use in a circuit for providing beam deflecting current and beam accelerating voltage for a cathode ray tube, said assembly including in combination, a magnetic core formed of first and second generally U-shaped portions, said core portions being positioned to form a substantially closed magnetic structure having first and second opposite sides which include the abutting arms of said U-shaped core portions, first and second winding means individually positioned on said first and second sides of said magnetic core respectively about said abutting arms of said core portions, said first winding means serving as an autotransformer for providing the beam deflecting current, means connecting said second winding means in series with said first winding means so that said first and second winding means together form an autotransformer in which the voltage is stepped up to provide the beam accelerating voltage, and supporting means for said core portions for holding said arms thereof in substantially abutting relation, said supporting means including adjustable means for separating the abutting arms of said core portions on said first side of said core to provide an adjustable gap therebetween and thereby vary the reluctance of the flux path through said first winding means, said supporting means including means for holding the abutting arms of said core portion on said second side of said core substantially in engagement with each other.

8. A cathode ray beam deflecting circuit of the type which includes a sawtooth current generator for delivering cyclically varying current to electromagnetic deflection means associated with a cathode ray tube, and which also includes rectifier means for delivering accelerating voltage to an accelerating anode of said tube, said circuit including a coupling choke unit having a magnetic core and winding means thereon forming an autotransformer, said winding means including a primary winding connected to the sawtooth current generator to be energized thereby, means connecting the deflection means in parallel with a portion of said primary winding which portion forms a secondary section thereof, and a high voltage winding connected in series with said primary winding to the rectifier means, said core having an air gap adjacent said primary winding, and means to vary the length of the air gap to thereby vary the magnetic reluctance of said core adjacent said primary winding and said secondary section thereof without substantially affecting the voltage produced by said high voltage winding.

9. A cathode ray beam deflecting circuit of the type which includes a sawtooth current generator for delivering cyclically varying current to electromagnetic deflection means associated with a cathode ray tube, and which also includes rectifier means for delivering accelerating voltage to an accelerating anode of said tube, said circuit including a coupling choke unit having a magnetic core and a winding thereon, said winding including a primary section connected to the sawtooth current generator to be energized thereby, a secondary section including a portion of said primary section, means connecting the deflection means in parallel with said secondary section, and a high voltage section connected through the rectifier means to the accelerating anode, and adjusting means for varying the magnetic reluctance of said core adjacent said primary and secondary sections for varying the amplitude of the current wave applied to the deflection means without substantially changing the amplitude of the high voltage applied to the accelerating anode.

10. In a cathode ray beam deflecting and accelerating circuit, a coupling choke unit including a magnetic core formed of two U-shaped portions, said portions being positioned to form a substantially closed magnetic circuit having opposite sides which include the abutting arms of said U-shaped core portions, first and second magnetically coupled winding sections individually positioned on said opposite sides of said core about said abutting arms, said first winding section serving as a primary winding and having a portion thereof serving as a secondary winding for providing deflecting current, said second winding section being connected in series with said first section and being spaced therefrom and serving as a high voltage winding, and adjusting means for varying the gap between abutting arms of said core portions adjacent said second winding section to thereby vary the high voltage produced by said choke unit without substantially affecting the deflecting current produced thereby.

11. A cathode ray beam deflecting circuit of the type which includes a sawtooth current generator for delivering cyclically varying current to electromagnetic deflection means associated with a cathode ray tube, and which also includes rectifier means for delivering accelerating voltage to an accelerating anode of said tube, said circuit including a coupling choke unit having a magnetic core and first and second winding sections in spaced relation thereon, said first winding section being connected to the sawtooth current generator to be energized thereby and serving as a primary winding, means connecting the deflection means in parallel with a portion of said first winding section for providing sawtooth current waves therein, said second winding section being connected in series with said first winding section and being connected through the rectifier means to the accelerating anode, and adjusting means for varying the magnetic reluctance of said core adjacent said second winding section for varying the effective inductance of said second winding section to thereby vary the amplitude of the accelerating voltage produced thereby without substantially changing the amplitude of the deflection current.

12. A cathode ray beam deflecting circuit of the type which includes a sawtooth current generator for delivering cyclically varying current to electromagnetic deflection means associated with a cathode ray tube, and which also includes first rectifier means for delivering accelerating voltage to an accelerating anode of the tube, said circuit including an electric discharge valve having an output electrode, a coupling choke unit having a magnetic core and first and second winding sections in spaced relation thereon, second rectifier means, condenser means, said first winding section connecting said output electrode of said valve to said condenser means, means connecting the deflection means in parallel with a portion of said first winding section for providing sawtooth current waves therein, circuit means connecting said second rectifier means and said portion of said first winding section in series with a source of potential to said condenser means for charging the same, said second winding section being connected in series with said first winding section and being coupled to the first rectifier means, and adjusting means for varying the magnetic reluctance of said core adjacent said first winding section.

13. A cathode ray beam deflecting circuit of the type which includes a sawtooth current generator for delivering cyclically varying current to electromagnetic deflection means associated with a cathode ray tube, and which also includes rectifier means for delivering accelerating voltage to an accelerating anode of the tube, said circuit including an electric discharge valve having an output electrode, a coupling choke unit having a magnetic core and first and second winding means thereon, a rectifier tube, condenser means, said first winding means connecting said output electrode of said valve to said condenser means, means connecting the deflection means in parallel with a portion of said first winding means for providing sawtooth current waves therein, circuit means connecting said rectifier tube and said portion of said first winding means in series with a source of potential to said condenser means for charging the same, said second winding means being connected in series with said first winding means and being coupled to the rectifier means for applying voltage pulses thereto, second condenser means bridged across said rectifier tube for reducing undesired oscillations in said winding means and for lengthening the voltage pulses applied to the rectifier means, and adjusting means for varying the magnetic reluctance of said core adjacent said first winding means.

14. A cathode ray beam deflecting circuit of the type which includes a sawtooth current generator for delivering cyclically varying current to electromagnetic deflection means associated with a cathode ray tube, and which also includes rectifier means for delivering accelerating voltage to an accelerating anode of the tube, said circuit including an electric discharge valve having an output electrode, a coupling choke unit having a magnetic core and first and second winding sections in spaced relation thereon, a rectifier tube, condenser means, said first winding section connecting said output electrode of said valve to said condenser means, means connecting the deflection means in parallel with a portion of said first winding section for providing sawtooth current waves therein, circuit means connecting said rectifier tube and said portion of said first winding section in series with a source of potential to said condenser means for charging the same, said second winding section being connected in series with said first winding section and being coupled to the rectifier means for applying voltage pulses thereto, and second condenser tube bridged across said rectifier means for reducing undesired oscillations in said winding section and for lengthening the voltage pulses applied to the rectifier means.

15. A coupling choke assembly for use in a circuit for providing beam deflecting current and beam accelerating voltage for a cathode ray tube, said coupling choke assembly including in combination, a magnetic core formed of first and second core members each including an elongated base portion and arms extending from the ends thereof to provide members of substantially U-shape, a supporting plate for said assembly, first supporting means for supporting said first core member on said supporting plate with said arms thereof extending away from said plate, second supporting means for said second core member for holding the same with the arms thereof substantially in abutment with the arms of said first core member to form a substantially closed magnetic circuit, said second supporting means including a strip extending along the base portion of said second core member, clip means for securing said second core member to said strip, spring means extending along the abutting arms of said core members on one side of said core and operatively connected to said strip and said supporting plate to hold said abutting arms on said one side of said core in close engagement with each other, and adjustable means operatively connected to said strip for separating the abutting arms of said core members on the side of said core opposite to said one side, said first supporting means including insulating means having a tubular portion positioned about said abutting arms of said core members on said opposite side of said core, and first and second winding means about said core, said first winding means being positioned on said tubular portion of said insulating means about said abutting arms on said opposite side of said magnetic core and serving as an autotransformer for providing the beam deflecting current, said second winding means being connected in series with said first winding means and serving as a high voltage winding for providing the beam accelerating voltage.

GEORGE W. FYLER.
LAWRENCE J. MATTINGLY.

References Cited in the file of this patent

UNITED STATES PATENTS

| Number | Name | Date |
|---|---|---|
| 1,756,875 | Montsinger | Apr. 29, 1930 |
| 2,133,919 | Fries | Oct. 18, 1938 |
| 2,136,798 | Lucas | Nov. 15, 1938 |
| 2,458,532 | Schlesinger | Jan. 11, 1949 |
| 2,476,854 | Friend | July 19, 1949 |
| 2,477,557 | Torsch | July 26, 1949 |
| 2,513,160 | Friend | June 27, 1950 |
| 2,536,838 | Clark | Jan. 2, 1951 |
| 2,536,839 | Clark et al. | Jan. 2, 1951 |
| 2,536,857 | Schade | Jan. 2, 1951 |
| 2,555,830 | Barco | June 5, 1951 |
| 2,611,105 | Fyler et al. | Sept. 16, 1952 |